United States Patent [19]
Orosy

[11] 3,875,789
[45] Apr. 8, 1975

[54] APPARATUS FOR TESTING END CLOSURES

[75] Inventor: Joseph James Orosy, Montvale, N.J.

[73] Assignee: American Can Company, Greenwich, Conn.

[22] Filed: Mar. 26, 1974

[21] Appl. No.: 454,835

[52] U.S. Cl. .................................. 73/40; 73/45.2
[51] Int. Cl. ............................................ G01m 3/04
[58] Field of Search ......... 73/37, 40, 41, 45.1, 45.2, 73/45.3, 45.4, 46, 49.2, 49.3, 49.8; 220/24 A, 51

[56] References Cited
UNITED STATES PATENTS
| | | | |
|---|---|---|---|
| 2,696,107 | 12/1954 | Blaing-Leisk | 73/45.2 X |
| 3,499,314 | 3/1970 | Roberts et al. | 73/45.2 |

Primary Examiner—Richard C. Queisser
Assistant Examiner—John S. Appleman
Attorney, Agent, or Firm—Robert P. Auber; Paul R. Audet; George P. Ziehmer

[57] ABSTRACT

An improved apparatus for testing container end closures for leakage, of the type utilizing a pressurized gas media and including a test chamber comprised of a vertically reciprocable upper chambered member and a fixed lower chambered member, the improvement in the test chamber for testing an end closure placed therein and having a displaceable member sealed thereto by a distensible sealant material, which comprises: means for effecting a separation between the end closure and displaceable member to distend the sealant material and expose it to the pressurized gas to test the sealant material and the seal it provides for leakage, the means for effecting the separation including a springmounted chuck connected to the lower chambered member and having a resisting surface, and, an engaging surface on the upper chambered member for moving end closure downward, while downward movement of the displaceable member is resisted by the chuck resisting surface.

12 Claims, 9 Drawing Figures

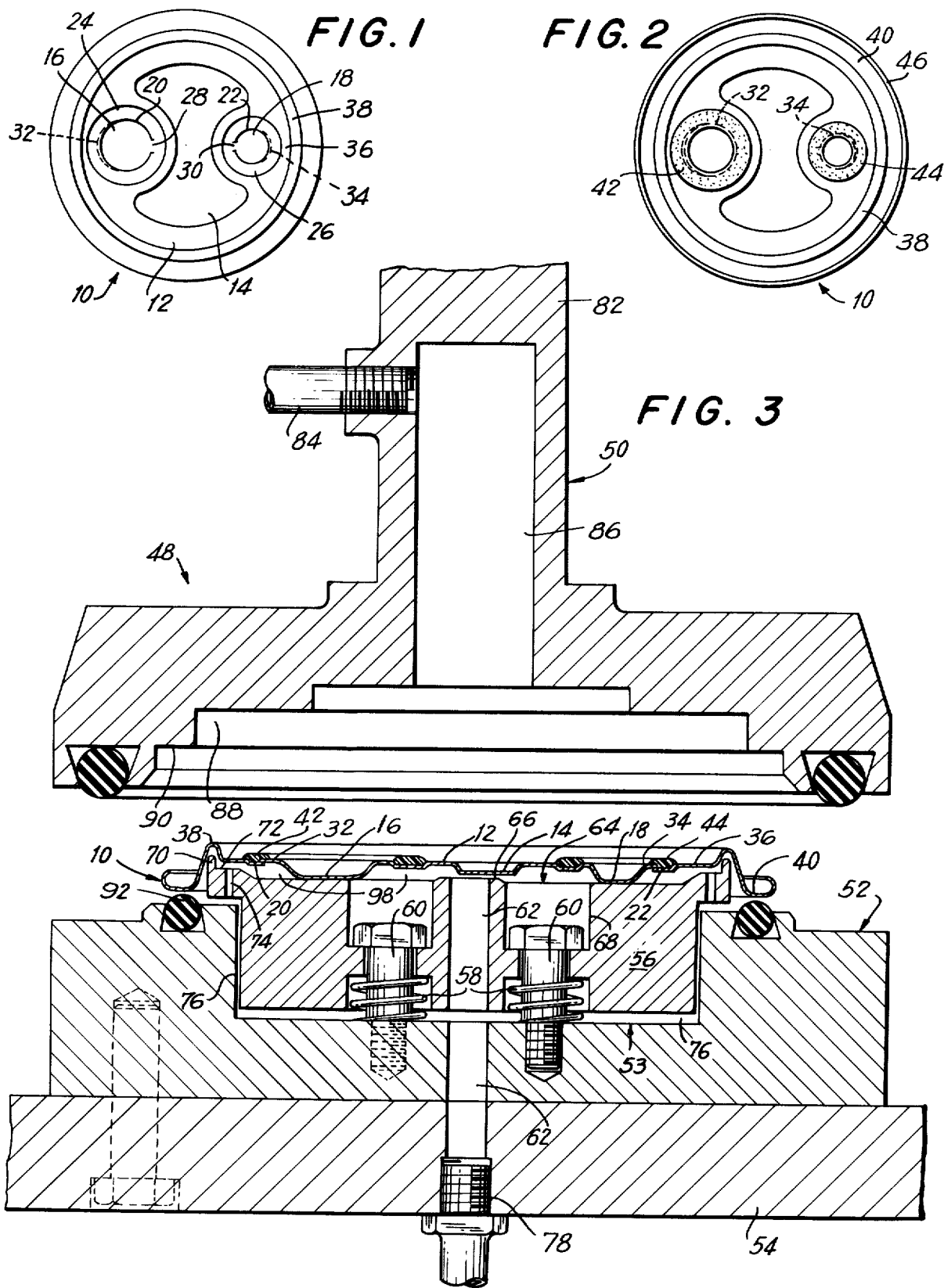

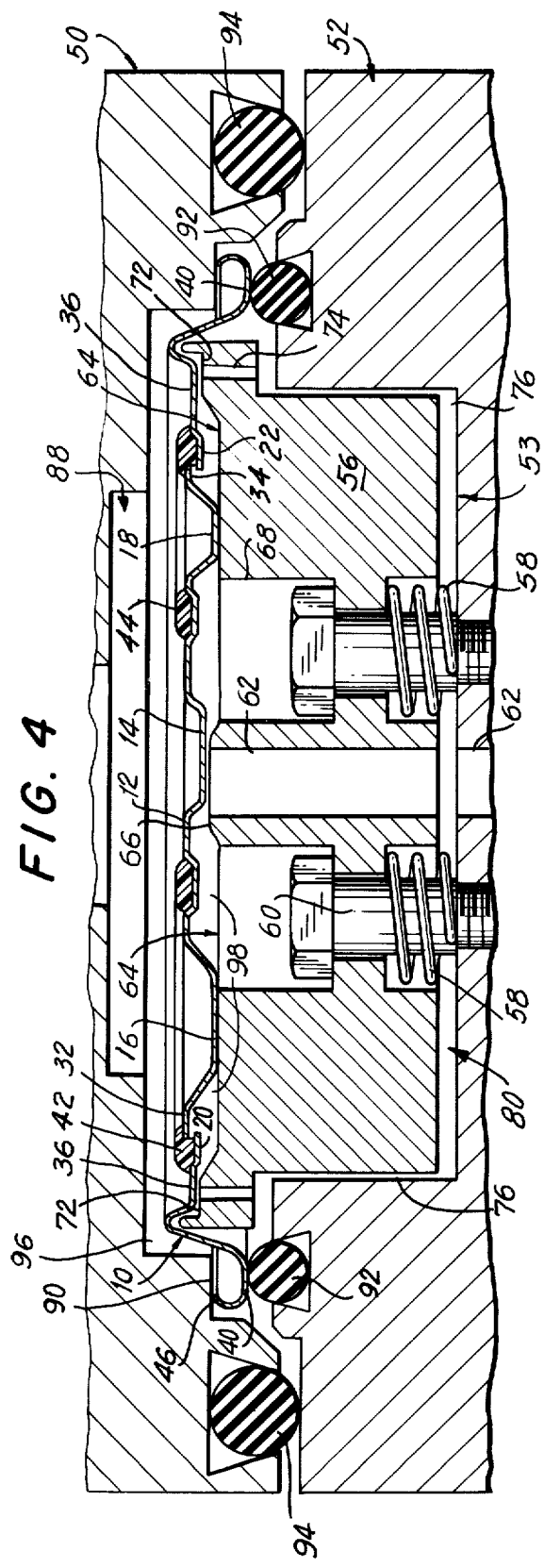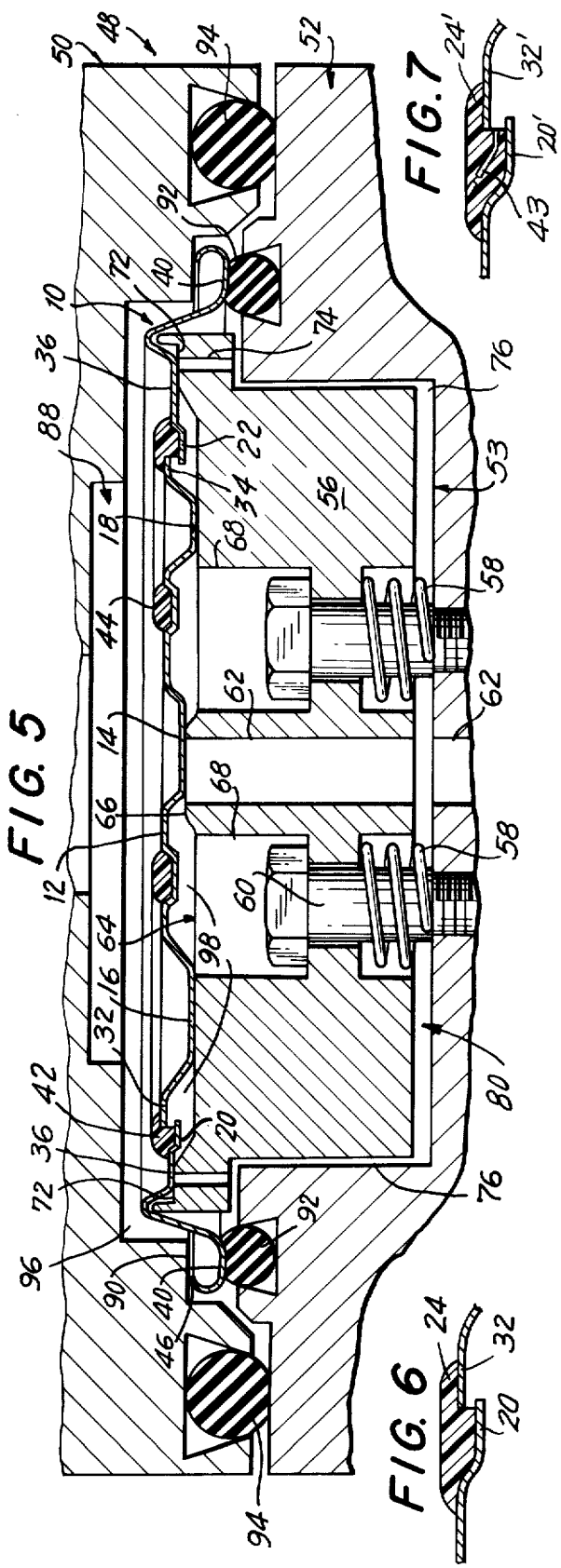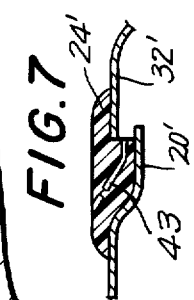

3,875,789

APPARATUS FOR TESTING END CLOSURES

BACKGROUND OF THE INVENTION

This invention relates to the art of testing container end closures for leakage.

Various apparatus exist for testing structures such as end closures or the like by introducing a gas into a confined area in which the end closure is placed and recording gas seepage or leakage therethrough. Notably, U.S. Pat. No. 3,499,314 issued on Mar. 10, 1970, discloses a testing apparatus wherein an end closure to be tested is placed within a cell or chamber thereby sealedly dividing the chamber into two sections, high-pressure gas is supplied into one section while the other is simultaneously purged to the atmosphere to thereby flex the end, gas leakage is monitored or sensed in the other section, and leakers are identified and ejected from the testing system.

One of the main problems with such high-pressure gas end closure testing apparatus is that they are unsuitable for testing an apertured structure or end closure having a displaceable member covering or closing the aperture and sealed to the structure by a distensible sealant material, such as for example metal button down end closures having displaceable opening tabs or buttons sealed to the end closures by a plastisol, hot melt or other plastic sealant material. The sealant materials are resistant to container product internal pressures yet finger-pressure-fracturable for opening the sealed aperture.

The sealant materials sometimes do not effect perfect seals due to imperfections in the materials such as voids, pinholes, pinhole channels and impurities lodged therein, and/or due to imperfect seals of and pathways through the sealant-metal end closure and/or button interfaces. It, therefore, is desirable to test the seals and sealant materials for leakage before the end closures are secured to filled containers and passed to consumers. But with conventional end closure testing methods and apparatus such as disclosed in the aforementioned patent, if for example a plastisol-sealed button down end closure is inverted and placed in a two-section test chamber and high-pressure gas were introduced into the upper chamber above the inverted downward metal-to-metal against the end closure panel aperture rim and thereby would prevent testing the effectiveness of the seal provided by the plastisol material. With such an apparatus, undesirably, false readings that ends do not leak would be obtainable when in fact there may not even be any plastisol present on the end. Subjecting the other side of the end closure, i.e. its intended top surface, to the high-pressure gas often results in button blow off, or excessive separation between buttons and their apertures which can tear the plastisol materials or otherwise destroy their seal to the button or end closure.

This invention overcomes the aforementioned problems by providing an improved apparatus for testing leakage of structures such as end closures having displaceable members such as buttons sealed to the structures or end closures by sealant materials.

The improvement in the apparatus resides in providing the test chamber with means for effecting a separation between the end closures and their displaceable members or buttons. The means for effecting the separation includes a chuck having a resisting surface for holding the buttons in a substantially fixed position while the rest of the end closure is moved away from the buttons.

It is an object of this invention to provide an improved apparatus for testing with a pressurized gas for leakage, container end closures having displaceable members sealed to the end closures by distensible sealant materials.

It is an object of this invention to provide the aforementioned apparatus wherein the end closures tested are metal button down end closure and the displaceable members are the buttons.

It is another object of this invention to provide the aforementioned apparatus wherein the end closures tested are button down end closures and the buttons are sealed thereto by a plastisol sealant material.

These and other objects and advantages of this invention will be apparent as it is better understood from the description which follows, which taken in conjunction with the drawing discloses preferred embodiments thereof.

BRIEF DESCRIPTION OF THE DRAWINGS

FIG. 1 is a top plan view of a button down end closure.

FIG. 2 is a bottom plan view of the end closure of FIG. 1.

FIG. 3 is an enlarged vertical section with portions broken away taken through the end closure of FIG. 1 horizontally disposed on the lower chambered member of the open test chamber of the improved apparatus of this invention.

FIG. 4 is an enlarged vertical cross section with portions broken showing the test chamber of FIG. 3 in a partially closed, unsealed position.

FIG. 5 is an enlarged vertical cross section with portions broken away showing a separation effected between the end closure and buttons, in the fully closed and sealed test chamber of FIG. 4.

FIG. 6 is an enlarged vertical cross section with portions broken away showing the distended sealant material at the separation effected between the end closure panel aperture and button rims.

FIG. 7 is an enlarged vertical cross-section with portions broken away showing a pinhole channel in the distended sealant material of FIG. 6.

DETAILED DESCRIPTION OF THE INVENTION

Figure 8:
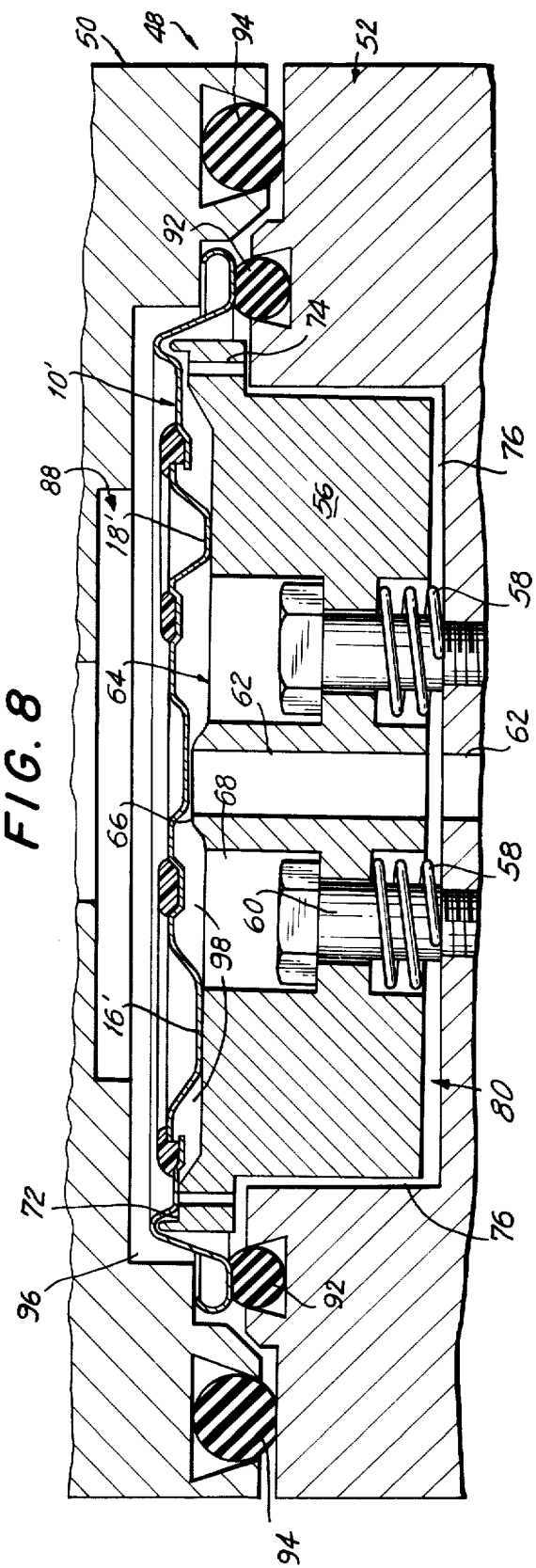
FIG. 8 is an enlarged vertical cross section similar to that of FIG. 5 showing the lower chambered member momentarily tilting to compensate for the difference in end closure button height.

Referring to the drawings in detail, FIG. 1 shows the top of a button down end closure generally designated 10 having a central panel 12 which includes raised reinforcing panel portion 14 and displaceable members, here shown as opening tabs or buttons 16, 18. Button 16 is intended as a pour button, and button 18 as a vent button. The buttons close, and their displacement provides, respective pour and vent apertures defined by central panel aperture rims 20, 22 which can each be formed of raised beads 24, 26. Buttons 16, 18 are connected to end closure 10 by integral hinges 28, 30, have raised central portions and button rims 32, 34 (dashed lines) extending under and beyond aperture rims 20, 22

(FIGS. 2 and 3). Central panel 12 also includes peripheral panel portion 36 which merges into a surrounding integral reinforcing groove 38 which in turn merges into peripheral flange 40 for securing the end closure to cylindrical container bodies as by conventional double seams.

FIG. 2., a bottom view of end closure 10, shows button rims 32, 34 (dashed lines) under respective rings of sealant material 42, 44 shown in the form of rings and which can be any suitable distensible or elastic sealant material commonly used for hermetically sealing end closure apertures by sealing portions, preferably the rims of displaceable members such as buttons 16, 18 to portions of rims of apertures which they cover or close. The sealant material can be of any suitable plastisol, thermoplastic such as hot melt, elastomeric plastic type tape, or adhesive foil sealant material. An example of a suitable sealant material is a plastisol grade polyvinyl chloride combined with a conventional plasticizer and compounding ingredients. This plastisol is heat curable to form a non-tacky somewhat yieldable material that retains the buttons in place and maintains a suitably hermetic seal under pressure of the magnitude normally found in beer and carbonated beverage containers. Conveniently, the rings fill the area formed by raised beads 24, 26 (FIG. 1) and surround and seal button rims 32, 34 to aperture rims 20, 22. Flange 40 includes a peripheral flange curl 46 which facilitates the seaming of the end closure to a container body. Button down end closure 10 is and can resist internal container pressures of up to about 90 psi developed at elevated temperatures of up to about 140°F., as often occurs for example during processing of containers for pressurized products such as beer, carbonated beverages and the like.

FIG. 3 is an enlarged vertical cross section with portions broken away of a test chamber, generally designated 48, which is part of a larger overall apparatus for testing end closures for leakage. Test chamber 48 includes vertically movable or reciprocable upper chambered member 50, fixed lower chambered member 52 affixed to support 54 and having a recess 53, and means connected to the chambered members for effecting a separation between an end closure and its displaceable member to test the end closure, the sealant material and the seal it provides for leakage. The separation effecting means includes a solid spring-loaded chuck 56 upwardly-biased by helical springs 58 and movably connected to and within the lower chambered member by shoulder bolts 60. Chuck 56 can also include a first axial gas exit channel 62, an upper resisting surface 64 for resisting downward movement of the buttons or their rims when the rest of the end closure, here including its aperture rims, is moved vertically downward, means such as a raised support surface 66 for preventing fully downward flexing of the central portion of end closure central panel 12, here its raised reinforcing panel portion 14, when the test chamber first section is highly pressurized, and bolt holes 68 for receiving shoulder bolts 60. The chuck resisting surface is substantially horizontal so that buttons of equal height will contact it at approximately the same time. Chuck 56 also includes peripheral upstanding flange 70, a radially inwardly-adjoining circumferential countersink panel 72 which is spatially above resisting surface 64 and has a second axial gas exit channel 74 which communicates through clearance 76 between chuck 56 and lower chambered member recess 53 to first gas exit channel 62 which in turn can communicate, as through the bore of bolt 78 screw-fastened within lower chambered member 52, with conventional sensing means (not shown) including means such as a transducer for detecting pressure increase in the lower chamber 80 due to leakage through horizontal disposed end closure 10 on chuck 56. The sensing means are connected to conventional sorting means (not shown) including means for rejecting leaker end closures from the test chamber. Lower chamber 80 includes the volume of clearance 76.

Upper chambered member 50 includes a shaft 82 to which is threadly connected an air line 84 communicating with shaft bore 86 in turn communicating with upper chamber 88. Upper chambered member 50 also includes separation effecting means including engaging means which can be in the form of circumferential engaging surface 90 for engaging end closure 10 on chuck 56 and for moving the end closure and chuck vertically downward. The engaging means or surface thereby cooperates with chuck resisting surface 64 to effect a separation and distend sealant material 42,44 by moving the end closure downward relative to and away from the buttons.

When test chamber 48 is in the open position shown in FIG. 3 and chuck 56 is in its uppermost upwardly-biased feed position, end closure 10 is seated thereupon only by contact between the respective button raised central portions and resisting surface 64. Chuck flange 70 orients the end closure thereon by fitting into end closure reinforcing groove 38. It is to be noted that in the open position shown in FIG. 3, peripheral central panel portion 36 does not contact chuck countersink panel 72, and end closure flange 40 does not contact lower chambered member O-ring 92.

As upper chambered member 50 is moved vertically downward from its raised position in FIG. 3 to its partially lowered position in FIG. 4, its circumferential engaging surface 90 engages end closure flange curl 46, forces and moves the non-displaceable portion of end closure 10 downward, and brings flange 40 into contact with and gradually partially compresses lower chambered member O-ring 92. Downward movement of buttons 16, 18 is resisted by resisting surface 64 of upwardly-biased chuck 56. Engaging surface 90 and resisting surface 64 cooperate by the aforementioned respective downward movement and resistance thereto, to effect the desired separation between the end closure aperture and button rims. Just when the separation occurs during the downward movement of the upper chambered member and whether and how much the downward force exerted through contact between the buttons and the chuck resisting surface moves the chuck downward, depends upon the amount of pressure of spring 58 relative to the abilities of the displaceable members and/or the plastisol and seal to withstand the spring pressure. The separation occurs when the upward spring pressure overcomes the displacement and distension resistance of the respective buttons, plastisol and seal. If there is no plastisol adjacent the end closure panel aperture and button rims, there will be little resistance to the spring pressure, chuck 56 will remain in its uppermost raised position (FIG. 3), and the separation will be effected approximately when engaging surface 90 first starts to move the non-displaceable end closure portion downward. If there is a plastisol ring adjacent the aperture and button rims but the seal is imperfect, for example because there is no adherence between portions of the plastisol ring and portions of the rims, there will be some resistance to the spring pressure, and the separation will tend to be delayed and gradual as chuck 56 is moved downward until the spring pressure increases sufficiently to overcome the plastisol-seal distension resistance. If the plastisol rim-to-rim seal is substantially continuous, as is usually the case, the plastisol-seal distension resistance is relatively greater and usually sufficient to move chuck 56 downward until end closure flange 40 initially contacts lower chambered member O-ring 92 and upper chambered member O-ring 94 initially contacts lower chambered member 52 (FIG. 4). This initial contact in FIG. 4 does not provide an air-tight seal of the test chamber.

The continued downward movement of upper chambered member 50 from its position in FIG. 4 to that of FIG. 5, moves the non-displaceable portion of end closure 10 including aperture rim 20 downward away from the buttons and their rims whose further downward movement is now sufficiently resisted or prevented by the upward spring pressure on chuck 56 which is now greater than the plastisol-seal distension resistance. Buttons 16, 18 are thereby held in a substantially fixed plane or position relative to the downward movement of the rest of end closure 10 which heretofore has been called the non-displaceable portion. It is to be noted that the downward movement of the non-displaceable portion of end closure 10 from FIG. 4 to FIG. 5 is allowed by, and closes, the gap between end closure peripheral panel portion 36 and chuck countersink panel 72. Contact between peripheral panel portion 36 and chuck countersink panel 72 prevents excessive distension of the plastisol sealant material.

The downward movement of upper chambered member 50 from FIG. 4 to FIG. 5 compreses O-ring 92 and upper chambered member O-ring 94 until test chamber 48 is closed (FIG. 5) and sealed air-tight from the environment. End closure 10 on chuck 56 divides test chamber 48 into two sections. The first section designated 96, includes the volume between the upper and lower chambered members between O-rings 94 and 92, and that above inverted end closure 10. The portion of the volume of first section 96 above end closure 10 corresponds to a portion of the volume of upper chamber 88. The second section of test chamber 48, generally designated 98, includes all of the volume formed by the seal between end closure flange 40 and compressed O-ring 92, which includes that existing between end closure 10 and chuck 56, that of gas exit channels 74 and 62, that within and along shoulder bolts 60 (one shown), and that of lower chamber 80 as previously defined.

While the button and aperture rims are separated and the sealant material is distended, as shown in FIG. 5, high-pressure gas fed from a supply (not shown) through line 84 and bore 86, is injected into and fills chamber first section 96. This pressure usually flexes end closure central panel 12 slightly downward and causes raised reinforcing panel portion 14 to contact chuck raised support surface 66 and thereby prevent further flexing of the central panel. When chamber first section 96 is gas pressurized, second section 98 is simultaneously brought to atmospheric pressure. Taking flexing into account, the slightest change or increase in gas pressure above atmospheric in second section 98 due to leakage through any portion end closure 10, is communicated through the gas exit channels, bolt holes and clearance to and is sensed by conventional sensing means (not shown). If there is leakage, a signal is sent by suitable means (not shown) to sorting means (not shown) which will reject and remove the leaker from the test chamber when upper chambered member 50 is later raised.

After the testing is completed, the high-pressure gas in first section 96 is drained through suitable conventional means such as ports and valves (not shown) to the atmosphere, upper chambered member 50 is raised, chuck 56 is springbiased upwardly to its uppermost position shown in FIG. 3, and tested end closure 10 is removed by suitable means from the test chamber.

FIG. 6 is an enlarged view with portions broken away of the distended ring of plastisol sealant material 24 at the separation between respective aperture and button rims 20, 32, on the left side of end closure 10 in FIG. 5.

FIG. 7 shows that when a plastisol sealant material 24' is distended by the separation effected between respective aperture and button rims 20', 32' otherwise undetectable pinhole channels 43 are often advantageously exposed to the pressurized gas and thin membranes or films supposedly sealing the pinholes are stressed and tested with suitable pressure, comparable to those pressures which the end closure will later be subjected to, here, comparable to those present in containers of or products such as beer and carbonated beverages.

FIG. 8 is an enlarged cross section similar to FIG. 5, which shows that when buttons 16', 18' are of different heights, chuck 56 compensates for the difference by momentarily tipping or tilting slightly out of its original natural substantially horizontal plane, here, slightly downward to the right to compensate for the greater vertical height of vent button 18'. After momentarily tipping, the right portion of the chuck will rise to about the level of the left side of the chuck such that the separation between the vent button and aperture rims will be slightly greater than that between the pour button and aperture rims.

Figure 9:
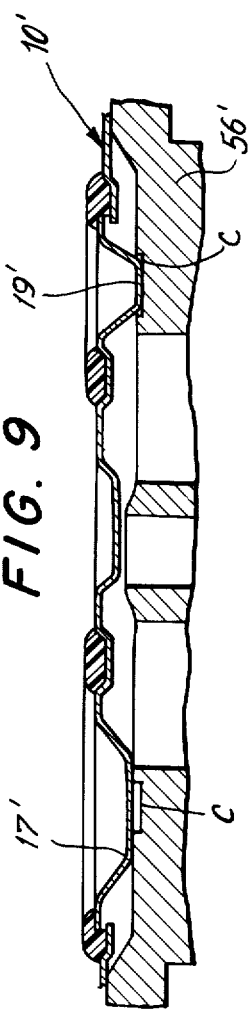
FIG. 9 is an enlarged cross section with portions broken away showing an alternative embodiment of the lower chambered member chucks of FIGS. 3–5 and 8.

FIG. 9 is an enlarged cross section as would be taken through the pour and vent button area of a button down end closure 10' and through an underlying portion of an alternative chuck embodiment 56'. FIG. 9 shows another way that a chuck can be adapted to compensate for button height differences. More particularly, FIG. 9 shows that chuck 56' can include an annular cutout generally designated C whose depth corresponds to the difference in height of vent button 19' over that of pour button 17', and whose width accepts the raised central portion of vent button 19' but not that of pour button 17'.

The separation between the end closure panel and its buttons can be effected by any suitable means which will provide the separation when the testing pressurized gas is in one of the chamber sections. The amount of separation and the amount of pressure provided must be coordinated to be non-destructive of the sealant material, that is, to not excessively distend, or destroy the material or separate it from or destroy its seal to, the panel and/or buttons. Although separation and pressure must not stress the sealant material, or the button connections beyond their elastic limits, separation preferably is sufficient to pressure-expose any voids, pinhole channels and impurities and to pressure-test thin webs or membranes supposedly sealing them.

The extent of separation is determined by controlling the relative heights of the buttons' raised central portion and the chuck countersink panel and resisting surfaces. The extent of separation desired preferably is equal to, but it can be less than the difference between the heights of the chuck countersink and resisting surfaces.

Depending on the sealant material employed, the extent of separation can be from measurable distances to about 0.010 inch, preferably less than about 0.007 inch, and most preferably less than about 0.005 inch for conventional plastisol sealant materials. Unless there is some measurable separation between the button and panel aperture rims, high-pressure gas forces or keeps the aperture and button rims in contact and a false reading that an end does not leak is possible even in the total absence of sealant material.

The amount of gas pressure employed to test conventional end closure sealant materials can be from about 5 to 80 or 90 psi. The range of gas pressure employed depends on the structure and sealant material tested. For testing end closures for beer and carbonated beverage containers, the higher pressures within this stated range are preferred; most preferably a high-pressure gas of about 80 psi is employed. The higher pressures tend to flex the central panel downwardly toward the chuck raised support surface, but such flexing is greatly reduced by the raised support surface and does not appear to significantly affect the extent of separation.

Preferably, lower chambered member O-ring 92 is constructed of or treated with a material such as silicone which would tend to prevent any adherence between the closure flange and O-ring, which might delay or resist the upward spring pressure and prevent chuck 56 from returning to its uppermost raised position, and carrying a tested end closure to a raised position for discharge from the test chamber (FIG. 3).

It is thought that the invention and many of its attendant advantages will be understood from the foregoing description and it will be apparent that various changes may be made in the structure of the apparatus without departing from the theory and scope of the invention or sacrificing all of its material advantages, the apparatus disclosed being merely preferred embodiments thereof.

I claim:

1. In an apparatus for testing an end closure for leakage of the type which includes a test chamber formed by a movable upper chambered member and a fixed lower chambered member and which is sealedly divisible into first and second sections by an end closure placed therein, means for injecting pressurized gas into the first section, and sensing means for detecting pressure increase in the second section due to leakage through the end closure, the improvement in the test chamber for testing an end closure having a displaceable member sealed thereto by a distensible sealant material, which comprises: means connected to the test chamber for effecting a separation between the end closure and its displaceable member, said separation effecting means including a spring-loaded chuck connected to and within the lower chambered member, said chuck having an upper resisting surface for initially seating an end closure thereon only by contact with the displaceable member, and for resisting downward movement of the displaceable member and holding it in a substantially fixed position when the rest of the end closure is moved vertically downward, and engaging means on the upper chambered member for engaging the seated end closure and for moving it vertically downward relative to and away from the resisted displaceable member, said chuck and engaging means thereby cooperating to effect the separation and distend the sealant material while the first section is highly pressurized and to expose the sealant material to the high-pressure gas to test the sealant material and the seal it provides for leakage.

2. The improved apparatus of claim 1 wherein the displaceable member has a raised central portion and wherein the chuck includes a circumferential countersink panel peripheral to and raised spatially above the resisting surface a distance less than the height of the raised central portion for preventing excessive separation between the end closure and displaceable member and excessive distension of the sealant material.

3. The improved apparatus of claim 2 wherein the end closure tested has a central panel and the improvement further comprises the chuck including means for preventing downward flexing of the central panel when the chamber first section is highly pressurized.

4. The apparatus of claim 3 wherein the end closure has two displaceable members whose raised central portions are of different heights and wherein the resisting surface includes an annular cutout whose depth is equal to the difference in height and whose width is sufficient to accept only the higher of the two displaceable members.

5. The improved apparatus of claim 4 wherein the sealant material is plastisol and it is distended less than about 0.005 inch.

6. The improved apparatus of claim 5 wherein the chuck includes a peripheral substantially vertical flange for orienting the seating of the end closure onto the chuck upper resisting surface, the flange being of a height which does not interfere with the downward movement of the end closure and the effecting of the separation between it and the displaceable member.

7. In an apparatus for testing an end closure for leakage of the type which includes a test chamber formed by a vertically movable upper chambered member and a fixed lower chambered member and which is sealedly divisible into first and second sections by an end closure placed therein, means for injecting high-pressure gas into the first section, and sensing means for detecting pressure increase in the second section due to leakage through the end closure, the improvement in the test chamber for testing a button down end closure having a displaceable button sealed thereto by a distensible sealant material, which comprises: means connected to the test chamber for effecting a separation between the end closure and its button, said separation effecting means including a spring-loaded chuck connected to and within the lower chambered member, said chuck having an upper resisting surface for initially seating an end closure thereon only by contact with the button, and for resisting downward movement of the button and holding it in a substantially fixed position when the rest of the end closure is moved vertically downward, and engaging means on the upper chambered member for engaging the seated end closure and for moving it vertically downward relative to and away from the resisted button, said chuck and engaging means thereby cooperating to effect the separation and distend the sealant material while the first section is highly pressurized and to expose the sealant material to the high-pressure gas to test the sealant material and the seal it provides for leakage.

8. The improved apparatus of claim 7 wherein the displaceable button has a raised central portion and wherein the chuck includes a circumferential countersink panel peripheral to and raised spatially above the resisting surface a distance less than the height of the raised central portion for preventing excessive separation between the end closure and button and excessive distension of the sealant material.

9. The improved apparatus of claim 8 wherein the end closure tested has a central panel and the improvement further comprises the chuck including means for preventing downward flexing of the central panel when the chamber first section is highly pressurized.

10. The apparatus of claim 9 wherein the end closure has two buttons whose raised central portions are of different heights and wherein the resisting surface includes an annular cutout whose depth is equal to the difference in height and whose width is sufficient to accept only the higher of the two buttons.

11. The improved apparatus of claim 10 wherein the sealant material is plastisol and it is distended less than about 0.005 inch.

12. The improved apparatus of claim 11 wherein the chuck includes a peripheral substantially vertical flange for orienting the seating of the end closure onto the chuck upper resisting surface, the flange being of a height which does not interfere with the downward movement of the end closure and the effecting of the separation between it and the buttons.

* * * * *